J. H. & P. C. ZWINGLER.
RESILIENT TIRE.
APPLICATION FILED JULY 23, 1915.
1,178,831.
Patented Apr. 11, 1916.
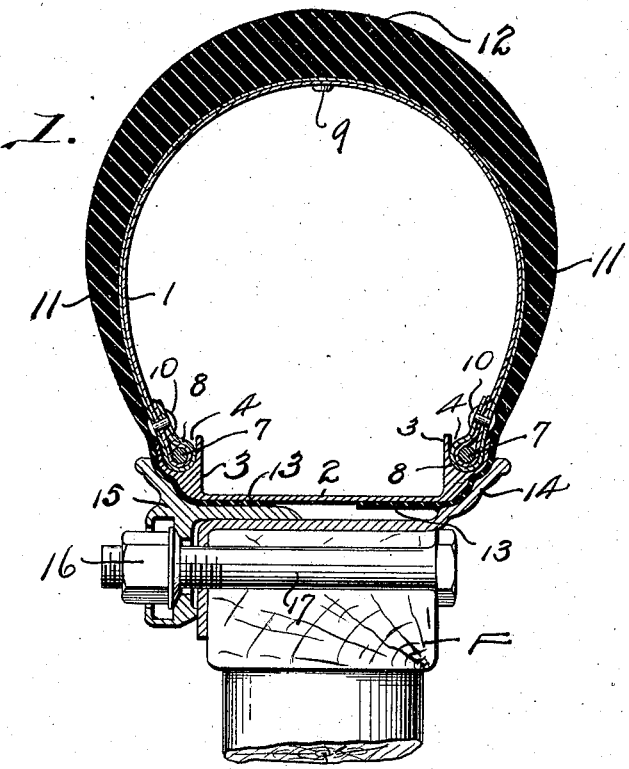
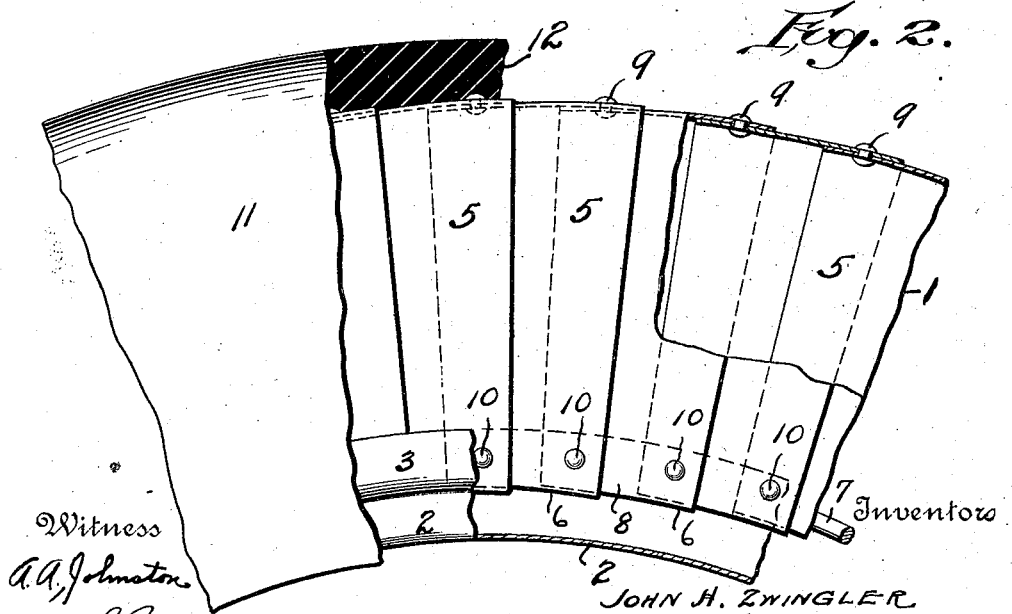
Witness
A. A. Johnston
C. H. Dummau
Inventors
John H. Zwingler
Philip C. Zwingler
By W. C. Carman
Attorney
THE COLUMBIA PLANOGRAPH CO., WASHINGTON, D. C.

UNITED STATES PATENT OFFICE.

JOHN H. ZWINGLER AND PHILLIP C. ZWINGLER, OF MINERAL RIDGE, OHIO.

RESILIENT TIRE.

1,178,831.  Specification of Letters Patent.  Patented Apr. 11, 1916.

Application filed July 23, 1915.   Serial No. 41,533.

*To all whom it may concern:*

Be it known that we, JOHN H. ZWINGLER and PHILLIP C. ZWINGLER, citizens of the United States, residing at Mineral Ridge, in the county of Trumbull and State of Ohio, have invented certain new and useful Improvements in Resilient Tires, of which the following is a specification.

This invention relates to the subject of resilient tires, and more particularly to tires of the cushion type involving internal spring supports.

A primary object of the invention is to provide an effective substitute for the ordinary pneumatic tire, and maintain a high degree of resilience without a complicated arrangement of springs as usually employed for such purposes.

A further object of the invention is to provide a resilient or spring tire construction of the character referred to which dispenses with the ordinary inner air tube, while at the same time being consolidated with a novel form of demountable rim in such a manner that the device as an entirety may be handled in the conventional way, that is, in the manner of the ordinary pneumatic tires which are carried upon demountable rims.

As a further object the invention contemplates a simple and practical arrangement of metallic spring elements permanently secured to each other so that no relative movement between the same is possible thereby increasing the life of both the shell and casing, and not only giving greater resiliency, but a firm and substantial construction which materially increases the tractive efficiency of the tire.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings in which—

Figure 1 is a vertical cross section of a tire constructed in accordance with the present invention. Fig. 2 is an enlarged composite fragmentary view showing the tire respectively in elevation and section.

Similar reference characters designate corresponding parts throughout the several figures of the drawings.

In carrying out the present invention, it is proposed to construct the tire in accordance with the general cross sectional design of standard pneumatic tires, and which will be capable of use in connection with the ordinary type of wheel attaching devices.

To this end, the invention essentially comprises a tire body composed of an inner metallic spring shell 1 which constitutes an internal tubular spring support, and a circular demountable attaching rim 2 which provides a rigid attaching base for the tire, and in effect constitutes a demountable rim adapted to be held in position on the wheel by the usual clamping devices to be presently referred to. By reference to Fig. 1, it will be observed that this demountable rim is of double channel formation having opposite inner flanges 3, in which are formed grooves 4 to receive the opposite edges of the tubular spring shell 1.

Referring more particularly to the spring shell or body 1, it will be observed that the same preferably includes a plurality of individual arched spring plates 5 arranged in overlapping relation. In order to facilitate the assembling of these plates in circular series to form the tubular tire body, the ends 6 thereof are folded about a wire or cable 7 which constitutes a core to provide the reinforcing bead 8 that snugly fits in the grooves 4 of the rim 2.

For the purpose of preventing any relative movement of the plates 5 at the tread portion of the shell, they may be rigidly united at the crown of the arch by means of suitable rivets or equivalent fastenings 9. It will thus be apparent that each individual plate will be tied or secured to an adjoining one so that there is no movement circumferentially at the tread portion of the shell. In order to further secure these plates together and positively prevent any relative movement or telescopic tendency therebetween, they may also be fastened at their ends 6 by means of the rivets 10. These fastenings not only unite the adjoining plates, but maintain the folded ends of the plates in bead form, as will be apparent from Fig. 1. With the arrangement described, whereby all of the plates are fastened together, it will be apparent that the shell will not yield circumferentially, but will give the desired resilience entirely by lateral expansion of the united plates.

As will be clear from the foregoing description, and inspection of Fig. 1, the beads 8 formed at the edges 6 of the internal shell are interlocked within the opposite grooves 4 of the rigid demountable attaching rim 2. Thus, the opposite edges of the arched shell are not only connected and held in spaced relation to maintain the proper width at the base of the tire, but a complete metallic tube is formed by the rim 2 which also provides the demountable element. For the purpose of completing the tire body, the spring shell or support 1 is preferably enveloped by a conventional rubber and canvas, or equivalent, covering 11, which constitutes the external shoe of the body. This external covering shoe is provided with a thickened tread portion 12 and tapering side portions which latter portions terminate in relatively thin flaps 13 adapted to extend over and cover the joints between the beads 8 and the grooves 4, and are to be tucked into the space between the demountable rim or base 2 and the main felly of the wheel.

From the foregoing, it will be understood that the improved resilient tire construction described includes, as a part thereof, a demountable rim element 2 which not only serves to give the necessary support and bow to the inner spring shell 1, but also enables the device as an entirety to be applied to a wheel and removed therefrom in the same manner as the ordinary pneumatic tires which are carried upon demountable rims. Accordingly, for the purposes of illustration, there is shown in Fig. 1 of the drawings a conventional form of clamping means applicable to wheel fellies and demountable tire rims. These clamping means include the usual upstanding fixed rim 14 carried by the wheel felly and located at one side edge thereof, and coöperating with the usual oppositely located holding clips 15 held in place by the fastening nuts 16 working on the threaded ends of the tie bolts 17, mounted in the wheel felly F. As shown in the illustration, the opposite flap portions 13 of the covering shoe 11 are clampingly engaged by the elements 14 and 15 of the clamping device, so that said elements not only engage and secure the demountable rim in position, but also clamp the said flaps 13 in such a manner, and in such locations, as to provide additional security for holding the edges 6 of the spring shell interlocked within the grooves 4 of the demountable rim.

Without further description, it is thought that the many features and advantages of the present invention will be readily apparent, and it will also be understood that minor changes in the form, proportion, and details of construction may be resorted to without departing from the spirit of the invention or scope of the appended claims.

We claim:

1. A wheel tire comprising, in combination with a wheel felly and opposite clamping elements carried thereby, a tire body unit including a hollow arched metallic spring shell consisting of a plurality of individual spring plates arranged in overlapping relation, said plates being rigidly connected at the crown of the arch and at their inner ends, and a rigid demountable rim having a flat body portion provided with outstanding edge flanges having grooves for receiving the terminal edges of said shell, said unit being held to said felly solely by said clamping elements engaging the rim thereof, and an external shoe having side portions which cover the joint between the spring shell and the demountable rim.

2. A wheel tire comprising, in combination with a wheel felly and opposite clamping elements carried thereby, a tire body unit including a hollow arched metallic spring shell consisting of a plurality of individual spring plates arranged in overlapping relation, said plates being rigidly connected at the crown of the arch and at their inner ends, and reinforcing cables permanently attached to the terminal ends of said individual arched spring plates to provide opposite heads, and also including a rigid demountable rim having edge flanges provided with grooves for receiving the beaded edges of said spring shell, said unit including the shell and rim being held to said felly solely by said clamping elements, and an external shoe having side portions which cover the joint between the spring shell and the demountable rim.

In testimony whereof we hereunto affix our signatures in the presence of two witnesses.

JOHN H. ZWINGLER.
PHILLIP C. ZWINGLER.

Witnesses:
A. E. WONDERS,
J. H. BOCK.